June 19, 1956 E. PELL Re. 24,168

INDUCTION MOTOR CONTROL BY ELECTRIC BRAKE

Original Filed Oct. 16, 1950 3 Sheets-Sheet 1

INVENTOR.
Eric Pell.
BY W. B. Dyson
ATTORNEY

INDUCTION MOTOR CONTROL BY ELECTRIC BRAKE

Original Filed Oct. 16, 1950 3 Sheets-Sheet 2

INVENTOR.
Eric Pell.
BY W. E. Ryon
ATTORNEY.

INDUCTION MOTOR CONTROL BY ELECTRIC BRAKE

Original Filed Oct. 16, 1950 3 Sheets-Sheet 3

INVENTOR.
Eric Pell.
BY
W. Shyou
ATTORNEY

United States Patent Office

Re. 24,168
Reissued June 19, 1956

24,168

INDUCTION MOTOR CONTROL BY ELECTRIC BRAKE

Eric Pell, Milwaukee, Wis., assignor to Cutler-Hammer, Inc., Milwaukee, Wis., a corporation of Delaware Original No. 2,636,157, dated April 21, 1953, Serial No. 190,361, October 16, 1950. Application for reissue March 28, 1955, Serial No. 497,484

11 Claims. (Cl. 318—302)

Matter enclosed in heavy brackets [ ] appears in the original patent but forms no part of this reissue specification; matter printed in italics indicates the additions made by reissue.

This invention relates to means for controlling the speed of electric motors and, more specifically, to control systems which are provided with an electromagnetically operating load brake, such as an eddy current brake or clutch, as one of the speed controlling devices.

It has heretofore been proposed to regulate the speed of alternating current motors of the slip ring induction type by mechanically coupling thereto an electromagnetic load brake, as, for example, a brake of the eddy current type; and various arrangements for automatically exciting the coil or winding of such brake to achieve the desired regulation have been proposed.

It is an object of the present invention to provide novel means for energization of the coil of brakes of the aforementioned character to afford the desired motor speed regulation, and more particularly to afford excitation of such brake coils proportional to the motor speed and without use of pilot generators, speed tachometer generators, frequency relays, or other devices functioning on the frequency or voltage of the motor secondary.

Another object of this invention is to afford brake coil excitation in proportion to motor speed as aforementioned deriving the controlling component of such excitation from the motor primary in a novel manner, thereby to afford brake coil excitation proportional to motor speed beyond synchronous speed of the motor and into the regenerative quadrant to cover the entire speed range of the motor.

A still further object of the invention is the utilization of a novel method of deriving a current proportional to the speed of the motor for energization of an electromagnetic load brake to afford speed regulation of a motor having appropriate secondary resistance, and more particularly to derive such current by balancing a current derived from the line voltage against a load current derived from the motor primary, which currents cancel one another at zero speed thus producing a net output control current proportional to motor speed.

Other objects and advantages of the invention will be apparent from the embodiments shown in the drawings and described hereinafter, it being understood that while the embodiment described relates to a hoist control the invention has a broader application and is to be afforded coverage within the scope of the appended claims.

In the drawing,

Figure 1 illustrates diagrammatically a hoisting control system embodying the invention;

Fig. 2 generally depicts in graphic form the derivation of brake energization current afforded by the control system illustrated in Fig. 1, while Figs. $2^a$, $2^b$ and $2^c$ depict such energization derivation at various motor speeds;

Figure 5:
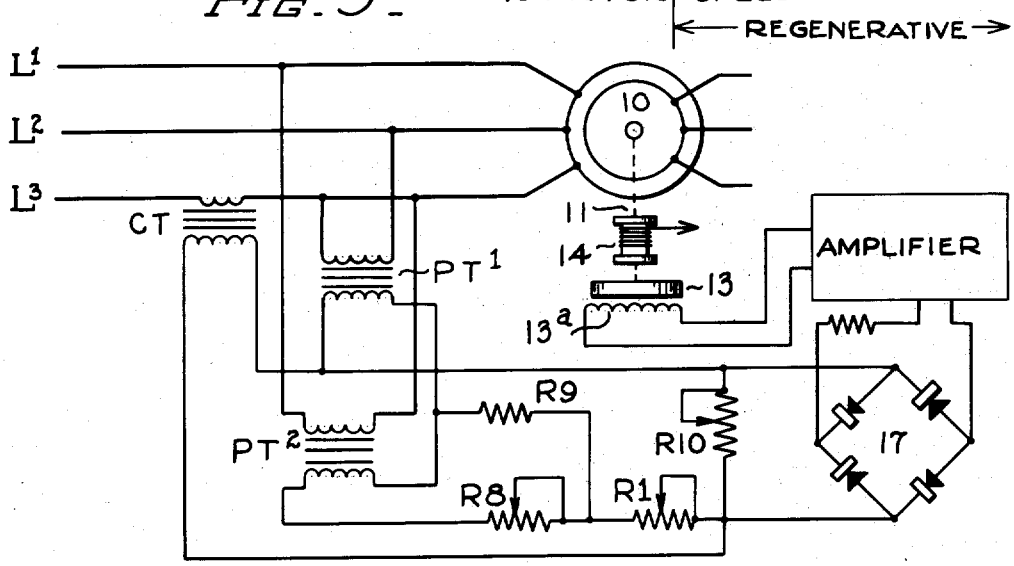
Figure 6A:
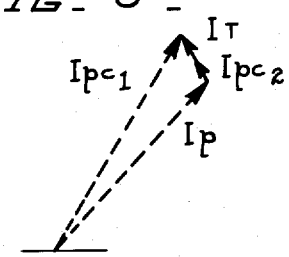
Figure 6:
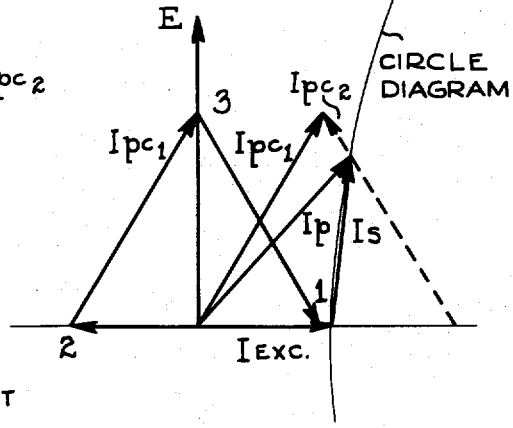
Figure 6B:
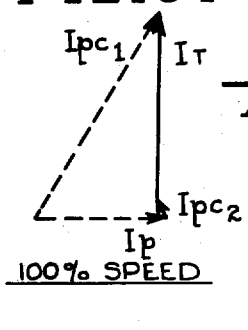
Figure 6C:
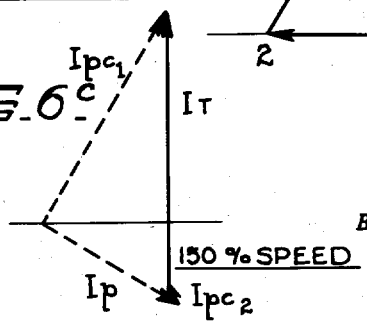

Fig. 5 diagrammatically illustrates a modification of the control system illustrated in Fig. 1 which may be preferred under certain circumstances to be hereinafter described; and Figs. 6, $6^a$, $6^b$ and $6^c$ are similar to Fig. 2 and depict the brake excitation derivation of the system illustrated in Fig. 5.

Figure 1:
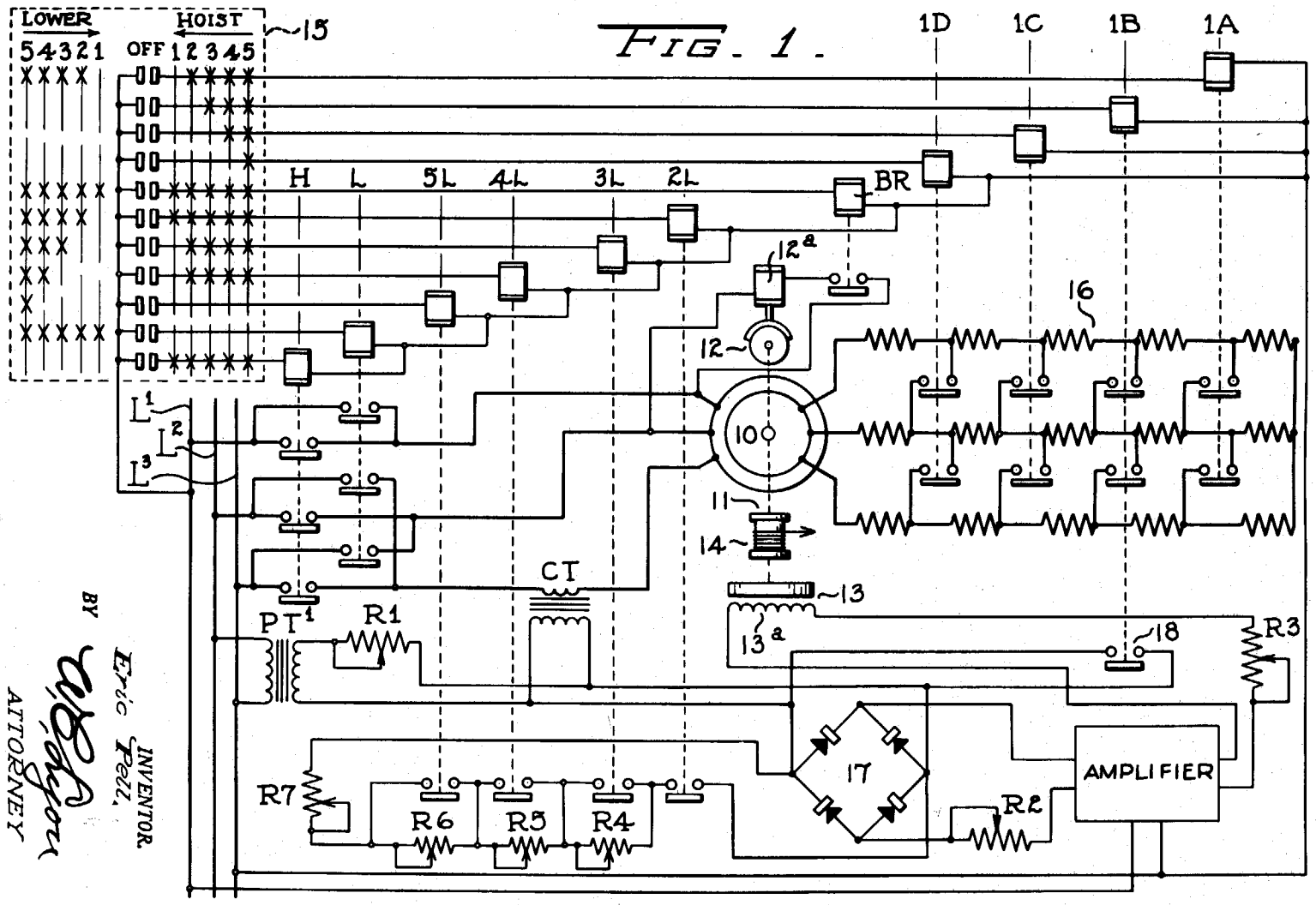

In the embodiment of the invention diagrammatically shown in Fig. 1 an alternating current induction motor 10 preferably of the slip ring type is employed. Mounted on one end of the motor shaft 11 is a mechanical brake 12 of conventional form adapted to be released by supplying current to the winding $\mathbf{12^a}$ thereof, while mounted on the other end of shaft 11 is a torque resisting means or load brake 13 of suitable form and having an exciting winding $\mathbf{13^a}$. Also mounted on shaft 11 is a hoisting drum 14 upon which a line sustaining a load is wound.

The motor 10 is preferably supplied with electrical energy from $L^1$, $L^2$, $L^3$, through one or the other of the contactors H or L for operation of the motor 10 in reverse directions selectively, the contactors H and L being under the control of a conventional drum controller enclosed within the dotted line rectangle 15, it being apparent that energization of the contactor H or contactor L, as the case may be, will in the embodiment of the invention illustrated, afford hoisting or lowering, respectively, of the load on drum 14.

Control of the speed of motor 10, disregarding for the moment the control afforded by the torque resisting brake or clutch 13, is provided in a conventional manner by varying the secondary resistance of the motor, the resistor grid arrangement referred to generally by the reference numeral 16, together with relays 1A, 1B, 1C, 1D under the control of the drum controller 15, for successively cutting out resistance in the usual manner with advance of the drum controller 15 from its "off" position being employed.

As will also be apparent, movement of drum controller 15 in either direction from its "off" position energizes the brake relay BR to close the circuit to winding $\mathbf{12^a}$ of mechanical brake 12 for release thereof.

As aforeindicated, further refinement of control over the speed of motor 10 under varying load conditions is afforded by the torque-resisting means 13 which may be of the eddy-current clutch type, powder metal clutch type or any other suitable torque resisting device capable of being energized in different degrees of excitation.

As also aforeindicated, the torque-resisting means 13 has an energizing coil or winding $\mathbf{13^a}$ which is preferably afforded excitation by a D. C. current obtained generally from the A. C. source $L^2$, $L^3$, through suitable rectifiers indicated generally by the reference numeral 17. A potential transformer $PT^1$ is preferably utilized for derivation of the aforementioned current as shown, but a direct connection to the line may be employed if desired.

Figure 2:
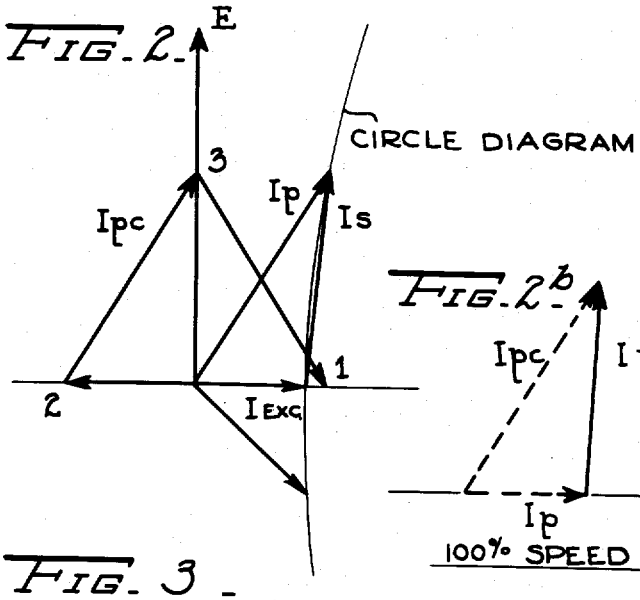
Figure 2A:
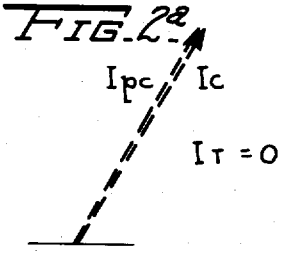
Figure 2B:
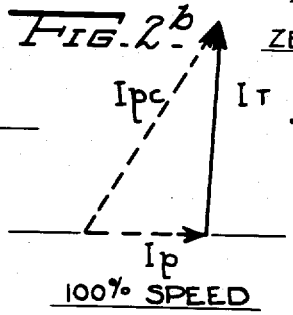
Figure 2C:
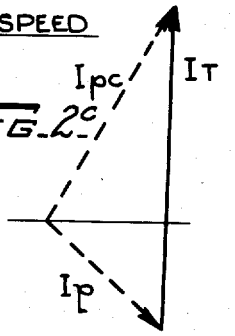

Combined with the aforementioned current derived from the voltage between phases 2 and 3 is a second current component, which is proportional to the load of phase 3 and is derived through a transformer CT connected in phase 3 of the motor primary as shown in Fig. 1. The motor is operated with a secondary resistance of 100%

$$\frac{E}{I\sqrt{3}}$$

resulting in a stalled motor primary current of 100% rated motor current as indicated in Fig. 2. Assuming a motor no-load, or exciting current of about 41.5% of rated motor current, this primary current will be in phase with the voltage between $L^2$, $L^3$. By proper adjustment of a resistor $R^1$ (Fig. 1), the current due to the phase voltage (2—3) can be made equal to that of the current transformer CT secondary with the motor stalled. This condition is illustrated in Fig. $2^a$. With the motor stalled these two currents will therefore cancel in the rectifier 17 and clutch coil $13^a$, leaving a current circulating in the transformer CT and resistor $R^1$ back to the line.

Figure 4:
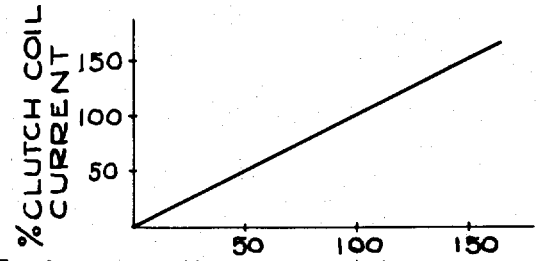
Fig. 4 depicts the proportionality of clutch or brake excitation to motor speed as afforded by the invention.

As the motor accelerates to synchronous speed, the primary current of motor 10 will follow a locus as shown by the circle diagram (Fig. 2). For any other condition than standstill the combination of the current derived from the voltage between $L^2$ and $L^3$ and that derived from the load of phase 3 of the motor primary through transformer CT will, therefore, result in a current component flowing through the rectifier 17 and the clutch coil $13^a$ which, as shown in Fig. 1, is connected to receive the output of the rectifier 17. For example, at synchronous speed the clutch coil current will be proportional to component (IT) of Fig. $2^b$; at 150% speed, this component will have further increased as shown in Fig. $2^c$. The output current of the rectifier will, therefore, vary substantially linearly with speed; that is, the rectified current of the clutch coil will be proportional to motor speed as shown in Fig. 4.

It should be noted at this juncture that clutch coil $13^a$ may be connected through resistor $R^3$ directly to rectifier 17 to receive the output thereof; or an amplifier of suitable form may be interposed therebetween as shown in Fig. 1 if deemed necessary, as for example, when the clutch coil is such as to require considerable amount of power for excitation thereof.

When an amplifier is utilized a resistor $R^2$ may be employed to afford adjustment and improve the response of the amplifier. The amplifier utilized may be of any suitable form, as for example, a magnetic amplifier, in which the operating portion of the characteristic is essentially linear and which may be biased so that its control current may be shifted so as to give zero or minimum output with zero input.

Referring again to Fig. 1, it will be seen that current to the clutch coil $13^a$ is in some cases by-passed through resistors $R^4$, $R^5$, $R^6$, and $R^7$ in accordance with the operation of relays $2^L$, $3^L$, $4^L$ and $5^L$, as will hereinafter be described.

It will, of course, be understood that the amount of torque developed by the clutch 13 depends upon its field current as well as the speed of the clutch armature. The stronger the field and the greater the speed, the greater the torque, as illustrated in Fig. 3.

Figure 3:
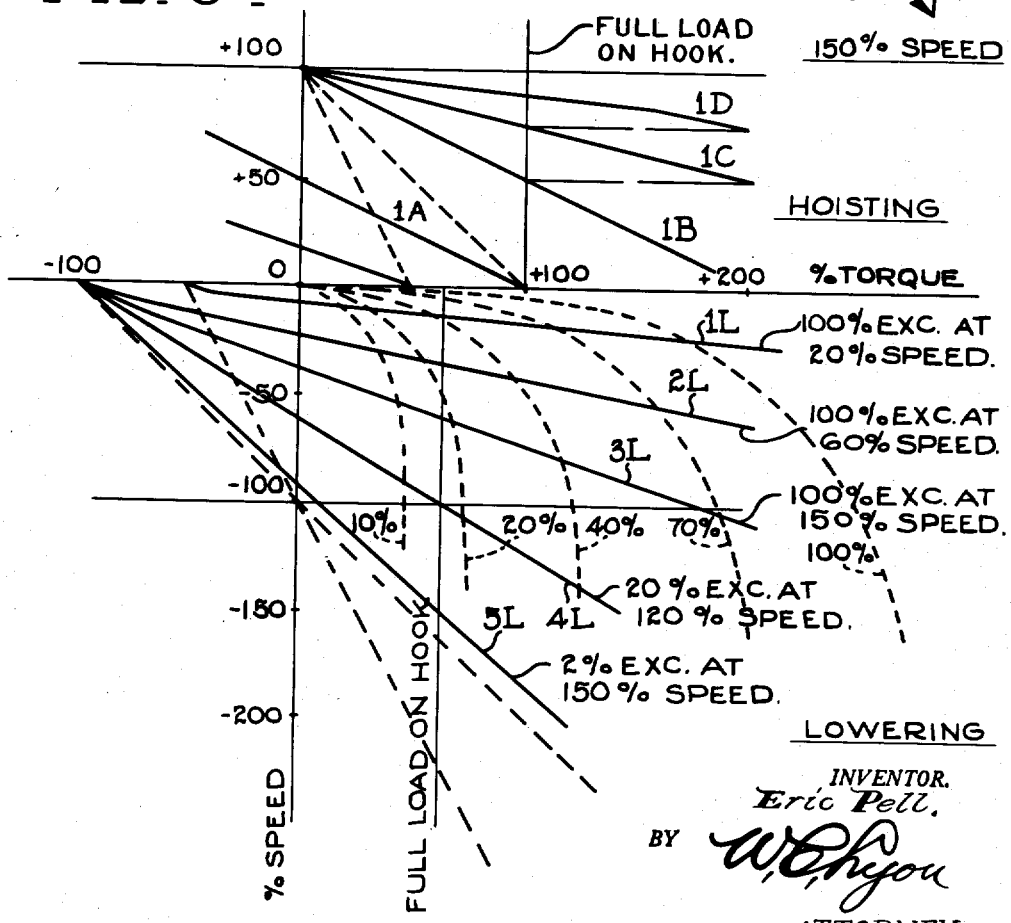
Fig. 3 illustrates the operating characteristics afforded by the control system in Fig. 1.

On the first point lowering, maximum braking torque is required and so the entire output of the rectifier is fed into the clutch field $13^a$, with the components as selected for Fig. 3. This results in 100% excitation of the clutch at approximately 20% speed. Since a stalled torque is provided for kick-off, the net braking torque will be less than the developed clutch torque at this speed, as indicated in Fig. 3.

Moving the master or drum controller to the second speed point lowering closes relay $2^L$ to by-pass some of the current through the clutch coil. This reduces the excitation of the clutch to approximately 100% at 60% speed, and thus the relative braking torque of the clutch, to provide a speed torque curve as shown by $2^L$ (Fig. 3). Further advancing the master to the fifth speed point will close relays $3^L$, $4^L$ and $5^L$ successively to lower the field current of the clutch 13 and produce speed torque curves as indicated by curves $3^L$, $4^L$ and $5^L$ (Fig. 3). This method of using a parallel circuit to regulate the current of the clutch is, of course, advantageous since the output of the current transformer CT is more or less independent of the circuit resistance as the current transformer tends to build up a higher secondary voltage to maintain a given ratio between its primary and secondary currents.

If desired to also utilize the effect of the clutch 13 in the hoisting direction for extra slow speed on the first two speed points, relays $2^L$ to $4^L$ may be energized as shown in Fig. 1. On the third speed point, the current transformer CT and rectifier 17 may be short-circuited by contactor $1^B$ which is provided with a set of auxiliary contacts 18 as shown to completely eliminate the effect of the clutch and permit full hoisting speed of the motor. The performance afforded by the aforedescribed arrangement is shown in Fig. 3 (hoisting quadrant).

As will be apparent from the foregoing description the clutch 13 acts as an electrical load brake. With an overhauling load, the speed of the motor will stabilize at a value such that the braking torque of the clutch ± the developed motor torque is equal to the overhauling torque of the load on the hook. For example, at zero motor torque, i. e., a hook load equal to the friction torque, the speed will stabilize at a value for which the motor torque is equal to the braking torque of the clutch 13. This is depicted in Fig. 3. The dotted curves represent the braking torque of the clutch or load brake 13 plotted against motor speed for some given constant value of the clutch field current, while the dotted straight lines represent the speed torque curves of the motor. The net braking torque shown by the heavy curves is obtained as the difference between the braking torque of the clutch and the driving torque of the motor. Since the clutch field current as obtained by the disclosed connection of transformers and rectifier is proportional to speed, these curves are identified with a given field current at some given speed of the motor. For example, curve $1^L$ is based on a field current of 100% at 20% speed. An examination will show that the net torque of $1^L$ at 20% speed is equal to the difference between the clutch torque and the driving torque of the motor at this speed. Assuming, for instance, a speed of twice this value, the field current will also double and the clutch torque correspondingly increase as indicated by the flatness of this speed torque curve. At lowering speeds beyond the minus 100%, the motor torque reverses and the net braking torque becomes the sum of the clutch and motor torques. The speed torque curves in the hoisting direction will become an image of those in the lowering direction, all things being equal.

Referring now to Fig. 5, there is illustrated a modification of the system shown in Fig. 1 to afford operation similar to that afforded by the system of Fig. 1 under other conditions to be hereinafter described, it being understood that the showing of Fig. 5 is only fragmentary as compared with Fig. 1, and that Fig. 5 has been abbreviated merely to render the same an expedient illustration of the modification about to be described. It will be noted that similar elements of Fig. 1 and Fig. 5 have been given the same reference characters.

As previously pointed out, the system of Fig. 1, and more particularly the relations depicted in Figs. 2, $2^a$, $2^b$ and $2^c$, are based on a motor exciting current of 41.5%. For motors departing considerably from this value, as for example, motors with lower or less favorable power factor, i. e., requiring a large exciting current as indicated in Fig. 6, it may be desirable to employ additional means for lining up the "stalled-motor" primary current and the "line voltage" current. As shown in Fig. 5, such means may take the form of an auxiliary potential transformer $PT^2$, the primary winding of which is connected across $L^1$, $L^3$, and the secondary winding of which is connected into the secondary circuit of $PT^1$ as shown.

The auxiliary potential transformer $PT^2$ will inject a voltage and current component $Ipc_2$ (Fig. 6) into the network to be combined with the current from $PT^1$ to produce a resultant current completely or partially (as desired) matching the primary current of the motor and resulting in a clutch coil current with a stalled motor, as shown in Fig. $6^a$. For 100% and 150% speed the clutch coil current would vary as indicated in Figs. $6^b$ and $6^c$, respectively. Lesser amounts of compensation may be obtained, if desired, by variation of the resistor $R^8$ in series with the potential transformer secondaries, as shown in Fig. 5. All other elements of the control system may be as shown in Fig. 1, it being necessary here merely to note that the resistors $R^4$ to $R^7$ are shown in Fig. 5 as an adjustable resistor $R^{10}$ for expediency of illustration. Thus motor performance corresponding to that shown in Fig. 3 may be afforded under varying conditions as aforementioned.

It will be apparent from the above-described embodiments and modification that speed control systems according to the invention can be altered and modified with respect to various details without departing from the principles of the invention and within the scope of its essential features set forth in the appended claims.

I claim:

1. The combination with an alternating current motor and torque resisting means mechanically connected with the shaft of said motor including windings adapted upon excitation to vary the braking effect of said torque resisting means, of means affording a current of selected proportionality in magnitude and corresponding in direction to the voltage of a phase of said motor, means affording for combination with said current a second current proportional in magnitude and corresponding in direction to the load current of one side of said phase of said motor, and means to combine such currents to obtain a resultant current substantially proportional to the speed of said motor and to subject the windings of said torque resisting means to said resultant current to afford excitation of said torque resisting means to control the speed of said motor throughout its entire speed range.

2. In an electrically driven hoist, the combination with an alternating current motor and torque resisting means mechanically connected with the shaft of said motor including windings adapted upon excitation to vary the braking effect of said torque resisting means, of means providing a current of selected proportionality in magnitude and corresponding in direction to the voltage of a phase of said motor, means for deriving a current from the motor primary proportional in magnitude and corresponding in direction to the load current of one side of said phase of said motor, and means for combining said aforementioned currents and delivering to said windings of said torque resisting means a rectified current substantially proportional to the speed of said motor thereby to afford excitation of said torque resisting means to control the speed of said motor throughout its entire speed range and under varying load conditions.

3. The combination with an alternating current motor and torque resisting means mechanically connected with the shaft of said motor including windings adapted upon excitation to vary the braking effect of said torque resisting means, of means for delivering to the windings of said torque resisting means a rectified current substantially proportional to the speed of said motor, said means including means for obtaining and combining a current proportional in magnitude and corresponding in direction to the voltage of a phase of said motor and a current proportional in magnitude and corresponding in direction to the load current of one side of said phase of the motor, and further comprising means for balancing said two currents so that they cancel each other at zero speed of the motor.

4. The combination with an alternating current motor having speed control means including means for varying the secondary resistance of the motor and torque resisting means mechanically connected with the shaft of said motor including windings adapted upon excitation to vary the braking effect of said torque resisting means, of means affording excitation of the windings of said torque resisting means with a rectified current substantially proportional to the motor speed, said last mentioned means comprising means for deriving a current of selected proportionality in magnitude and corresponding in direction to the voltage of a phase of the motor, means for deriving a second current proportional in magnitude and corresponding in direction to the load current of one side of said phase of said motor, means for combining said currents to obtain a resultant current substantially proportional to the speed of said motor, and control means for varying the amount of said resultant current applied to said windings in a predetermined relationship to the variation in secondary resistance of the motor afforded by said secondary resistance varying means.

5. The method of exciting windings of torque resisting means connected to a motor for control of the speed thereof which comprises combining a current of selected proportionality in magnitude and corresponding in direction to the voltage across a phase of the motor with a current proportional in magnitude and corresponding in direction to the load current of one side of said phase of the motor, rectifying the resultant current, and exciting said windings therewith to afford energization of said torque resisting means substantially proportional to the speed of said motor.

6. The method of exciting windings of torque resisting means connected to a motor for control of the speed thereof which comprises deriving a current proportional in magnitude and corresponding in direction to the voltage across a phase of the motor, deriving a second current proportional in magnitude and corresponding in direction to the load current of one side of said phase of the motor speed, balancing the currents so derived to cancel each other at zero motor speed to obtain a resultant current substantially proportional to the motor speed, rectifying the resultant current, and subjecting said windings thereto for energization of said torque resisting means.

7. The combination with an alternating current motor having first, second and third input leads and torque resisting means mechanically connected with the shaft of said motor including windings adapted upon excitation to vary the braking effect of said torque resisting means, of means affording a current proportional in magnitude and corresponding in direction to the voltage between said first and second input leads of said motor, means connected in said first input lead of said motor primary for deriving a current proportional in magnitude and corresponding in direction to the load current of said first input lead, means connected across said first and third input leads and of said motor primary for deriving a compensating current, and means for combining said three currents to produce a resultant current substantially proportional to motor speed for delivery to said windings thereby affording energization of said torque resisting means to control the speed of said motor throughout its entire speed range.

8. In an electrically driven hoist the combination with an alternating current motor having first, second and third input leads and torque resisting means mechanically connected with the shaft of said motor including windings adapted upon excitation to vary the braking effect of said torque resisting means, of means affording a current proportional in magnitude and corresponding in direction to the voltage between said first and second leads of said motor, means connected in said first input lead of said motor primary for deriving a current proportional in magnitude and corresponding in direction to the load current of said first input lead, means connected across said first input lead and the third input lead of said motor primary for deriving a compensating current, means for balancing said first and third currents against said second current to cancel one another at zero motor speed thereby affording a resultant current substantially proportional to motor speed, and means for rectifying said resultant current and subjecting said windings thereto for energization of said torque resisting means to control the speed of said motor throughout its entire speed range.

9. The method of exciting windings of torque resisting means connected to a motor having first, second and third input leads for control of the speed thereof which comprises, deriving a current proportional in magnitude and corresponding in direction to the voltage across said first and second input leads of said motor, deriving a second current proportional in magnitude and corresponding in direction to the load current of said first input lead, deriving a compensating current proportional in magnitude and corresponding in direction to the voltage across said first and third input leads of said motor, balancing said first current and said compensating current against said second current to cancel one another at zero motor speed to produce a resultant current substantially proportional to motor speed and rectifying the resultant current for delivery to said windings for energization of said torque resisting means.

*10. A motor and control system combination comprising an electric motor mechanically connected to a braking means which has a flux producing winding means and is operable to exert a braking torque in relation to the amount of power supplied to said winding means, control power means connected to a circuit of the motor and operative to provide control power at a potential that depends upon an electrical condition of said circuit of the motor, amplifying means electrically connected to said control power means and operative in response to the potential of the control power to produce amplified power at a potential of uniform polarity that depends in magnitude upon the potential of said control power, and means connecting said amplifying means to said winding means for supplying said amplified power to said winding means throughout the entire speed range of said motor.*

*11. A motor and control system combination comprising an electric motor having a circuit an electrical condition of which is dependent upon the speed of the motor and which motor is mechanically connected to a braking means which has a flux producing winding means and is operable to exert a braking torque in relation to the amount of power supplied to said winding means, control power means arranged to be connected to said circuit of the motor operative to provide control power at a potential that depends upon the speed of the motor, amplifying means electrically connected to said control power means and operative in response to the potential of said control power to produce amplified power at a potential of uniform polarity that depends in magnitude upon the potential of said control power, and means connecting said amplifying means to said winding means for supplying said amplified power to said winding means throughout the entire speed range of said motor.*

References Cited in the file of this patent or the original patent

UNITED STATES PATENTS

| | | |
|---|---|---|
| 2,458,454 | Winther | Jan. 4, 1949 |
| 2,488,210 | Leitch | Nov. 15, 1949 |
| 2,488,238 | Rathbun | Nov. 15, 1949 |
| 2,493,607 | Wendelburg et al. | Jan. 3, 1950 |
| 2,534,423 | Douglas et al. | Dec. 19, 1950 |